United States Patent
Grosch

(10) Patent No.: US 8,899,274 B1
(45) Date of Patent: Dec. 2, 2014

(54) FIBERGLASS FLANGED PIPE AND METHOD OF MAKING SAME

(71) Applicant: Wayne A. Grosch, Dublin, GA (US)

(72) Inventor: Wayne A. Grosch, Dublin, GA (US)

(73) Assignee: Universal Fiberglass, LLC, Dublin, GA (US)

( * ) Notice: Subject to any disclaimer, the term of this patent is extended or adjusted under 35 U.S.C. 154(b) by 0 days.

(21) Appl. No.: 14/181,987

(22) Filed: Feb. 17, 2014

(51) Int. Cl.
- *F16L 9/00* (2006.01)
- *F16L 23/16* (2006.01)
- *B29C 65/48* (2006.01)

(52) U.S. Cl.
CPC ............... *F16L 23/16* (2013.01); *B29C 65/483* (2013.01)
USPC ............................ 138/109; 285/405; 285/408

(58) Field of Classification Search
USPC ................ 138/109; 285/405, 408, 334.5, 414
See application file for complete search history.

(56) References Cited

U.S. PATENT DOCUMENTS

| | | | | |
|---|---|---|---|---|
| 2,675,253 A | * | 4/1954 | Stade | 285/408 |
| 3,406,991 A | * | 10/1968 | Decker, Jr. et al. | 285/408 |
| 3,661,670 A | | 5/1972 | Pierpont, Jr. | |
| 4,640,530 A | * | 2/1987 | Abbes et al. | 285/18 |
| 4,691,740 A | * | 9/1987 | Svetlik et al. | 138/109 |
| 4,893,658 A | | 1/1990 | Kimura et al. | |
| 5,443,099 A | | 8/1995 | Chaussepied et al. | |
| 5,785,092 A | | 7/1998 | Friedrich et al. | |
| 5,813,437 A | * | 9/1998 | Esser | 138/109 |
| 5,954,371 A | * | 9/1999 | Koke et al. | 285/55 |

\* cited by examiner

*Primary Examiner* — Patrick F Brinson
(74) *Attorney, Agent, or Firm* — Dennis L. Thomte; Thomte Patent Law Office LLC

(57) ABSTRACT

An elongated pipe, having first and second ends, with each of the first and second ends thereof having an outwardly tapered portion. A tapered split collet embraces the outwardly tapered portion at the first end of the pipe and a tapered split collet embraces the outwardly tapered portion at the second end of the pipe. A pipe flange with a tapered central opening embraces the tapered split collet at the first end of the pipe. A pipe flange with a tapered central opening embraces the tapered split collet at the second end of the pipe. An adhesive material secures the pipe flanges and collets to the outwardly tapered portions at the first and second ends of the pipe.

9 Claims, 4 Drawing Sheets

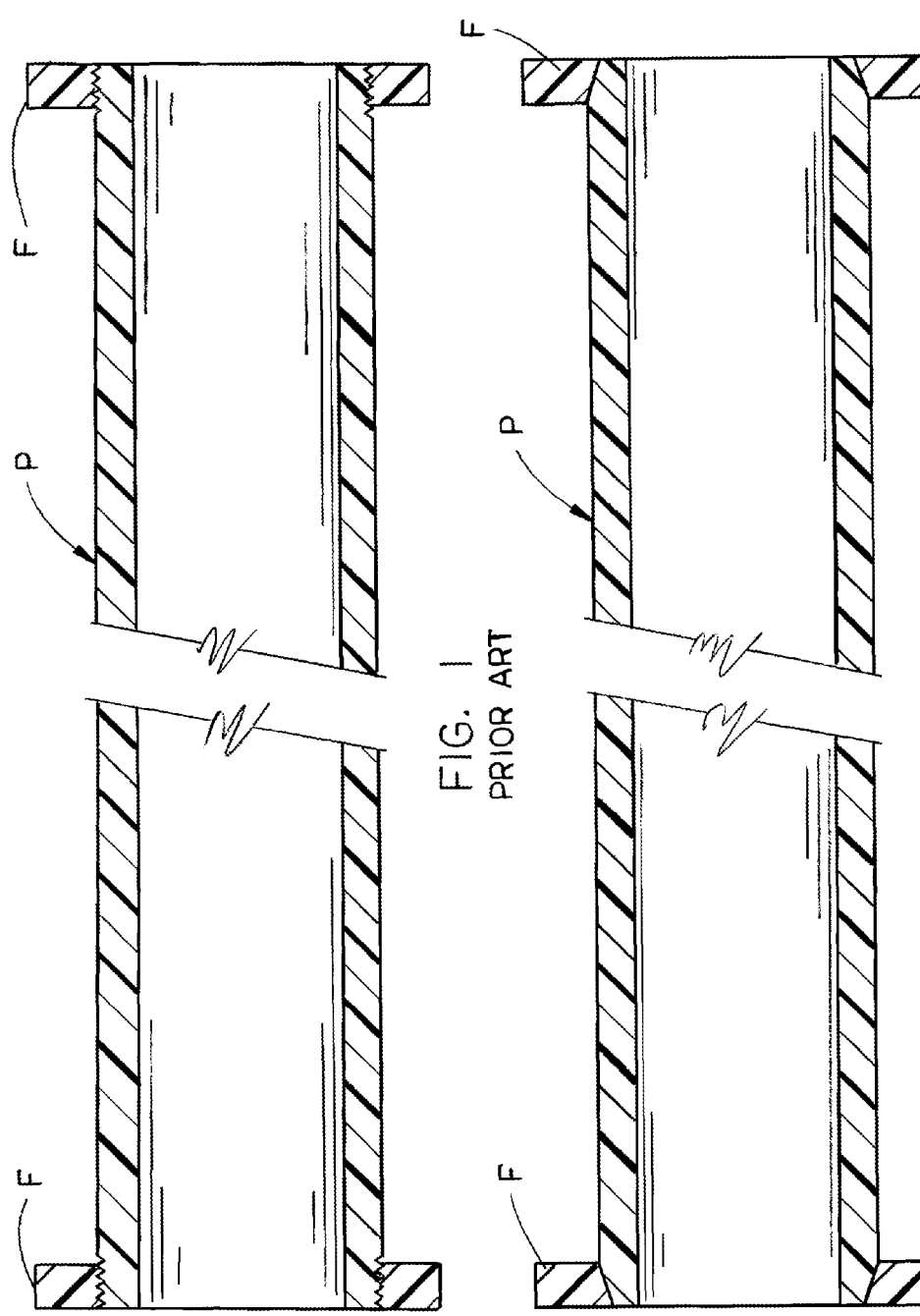

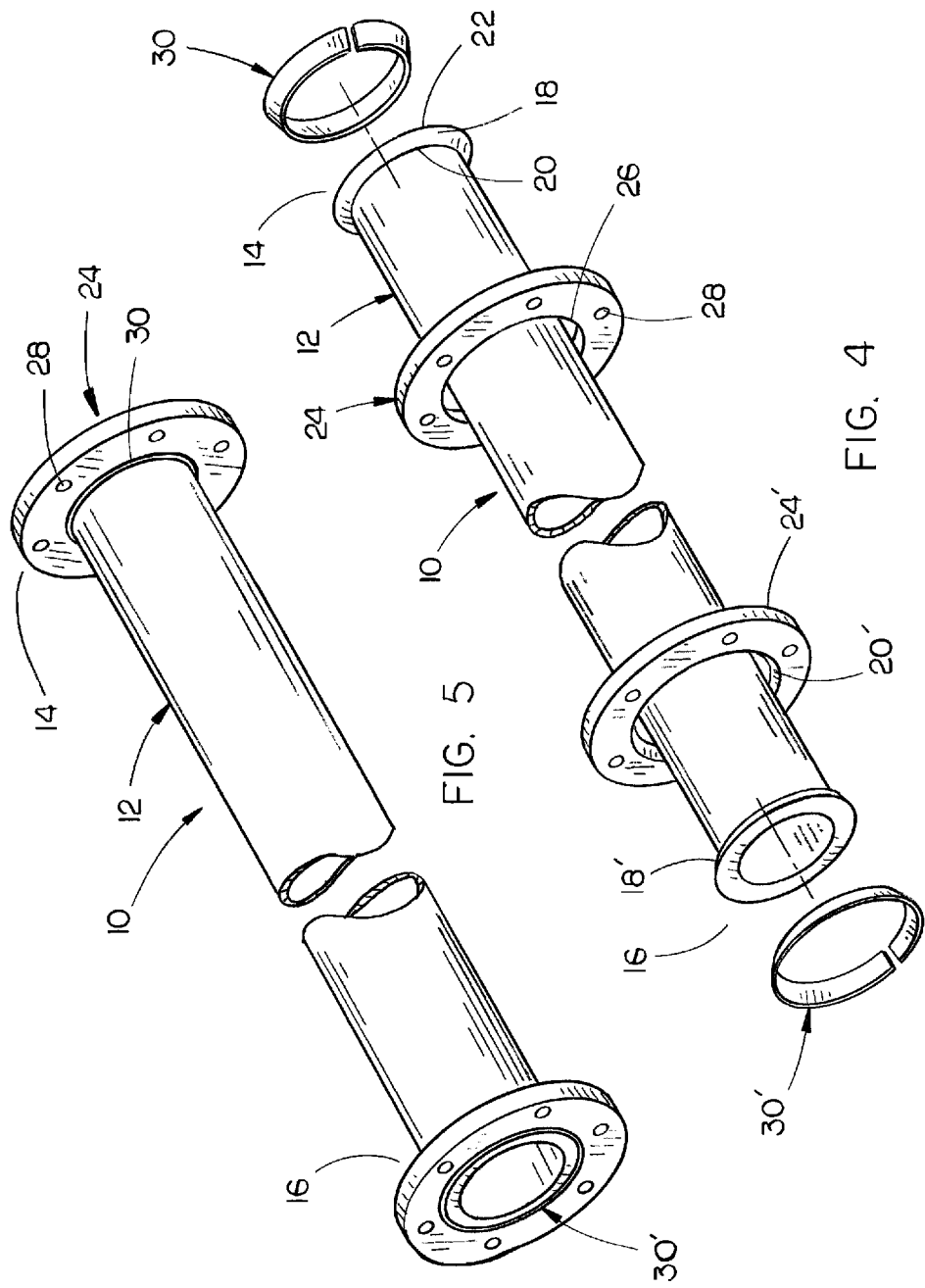

FIBERGLASS FLANGED PIPE AND METHOD OF MAKING SAME

BACKGROUND OF THE INVENTION

1. Field of the Invention

This invention relates to a fiberglass pipe having flanges secured to the opposite ends thereof. The flanges are secured to the pipe in a unique manner to prevent the separation of the flanges from the pipe. Further, this invention relates to the method of making the flanged fiberglass pipe.

2. Description of the Related Art

Fiberglass wound or fiberglass pipes have long been used in various fields. In most cases, the pipes have had flanges secured to the opposite ends thereof. Applicant's assignee has been manufacturing fiberglass pipes such as shown in FIG. 1 for some time. As seen in FIG. 1, the flanges F are threaded onto the ends of the pipe P. In FIG. 2, a further prior art method of securing the flanges F to the pipe is shown. In FIG. 2, the ends of the pipe P are inwardly tapered with the ring-shaped opening in the flange F having a matching taper so that the flange may be slipped onto the tapered portion of the pipe and secured thereto with epoxy or some other adhesive. In the prior art pipe of FIG. 2, the flange F may separate from the pipe P should the epoxy fail since the epoxy is the sole means for securing the flange to the pipe.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A novel fiberglass flanged pipe and the method of making the same is disclosed. The method of fabricating the fiberglass flanged pipe comprises the steps of: (1) providing an elongated fiberglass pipe having first and second ends; (2) forming an outwardly tapered portion at each of the first and second ends of the pipe with each of the tapered portions having an outer end; (3) providing first and second fiberglass pipe flanges having a tapered central opening with the tapered central openings of the pipe flanges having a greater diameter than the diameter of the outer ends of the tapered portions of the pipe; (4) slipping the first and second pipe flanges onto the first and second ends of the pipe respectively; (5) providing first and second fiberglass tapered split collets; (6) spreading and slipping the first and second collets onto the first and second ends of the pipe; (7) positioning the first and second collets with respect to the first and second tapered portions of the pipe so that the collets embrace the tapered portions thereof; (8) securing the collets to the tapered portions of the pipe with an epoxy material; (9) positioning the first and second pipe flanges so that the tapered central openings in the first and second pipe flanges embrace the first and second tapered split collets respectively; and (10) securing the first and second pipe flanges to the first and second collets respectively with an epoxy material.

The resulting product is a flanged fiberglass pipe which is designed to prevent the separation of the flanges from the pipe.

It is therefore a principal object of the invention to provide an improved fiberglass flanged pipe.

A further object of the invention is to provide a fiberglass pipe wherein the flanges thereof are secured to the pipe in a manner which will prevent the accidental separation of the flanges from the pipe.

A further object of the invention is to provide a fiberglass flanged pipe which is extremely durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a partial longitudinal sectional view of a prior art fiberglass flanged pipe;

FIG. 2 is a partial longitudinal sectional view of another prior art fiberglass flanged pipe;

FIG. 4 is a partial exploded perspective view of the fiberglass pipe of this invention;

FIG. 5 is a partial perspective view of the fiberglass pipe of this invention;

DESCRIPTION OF THE PREFERRED EMBODIMENT AND METHOD

Figure 3:
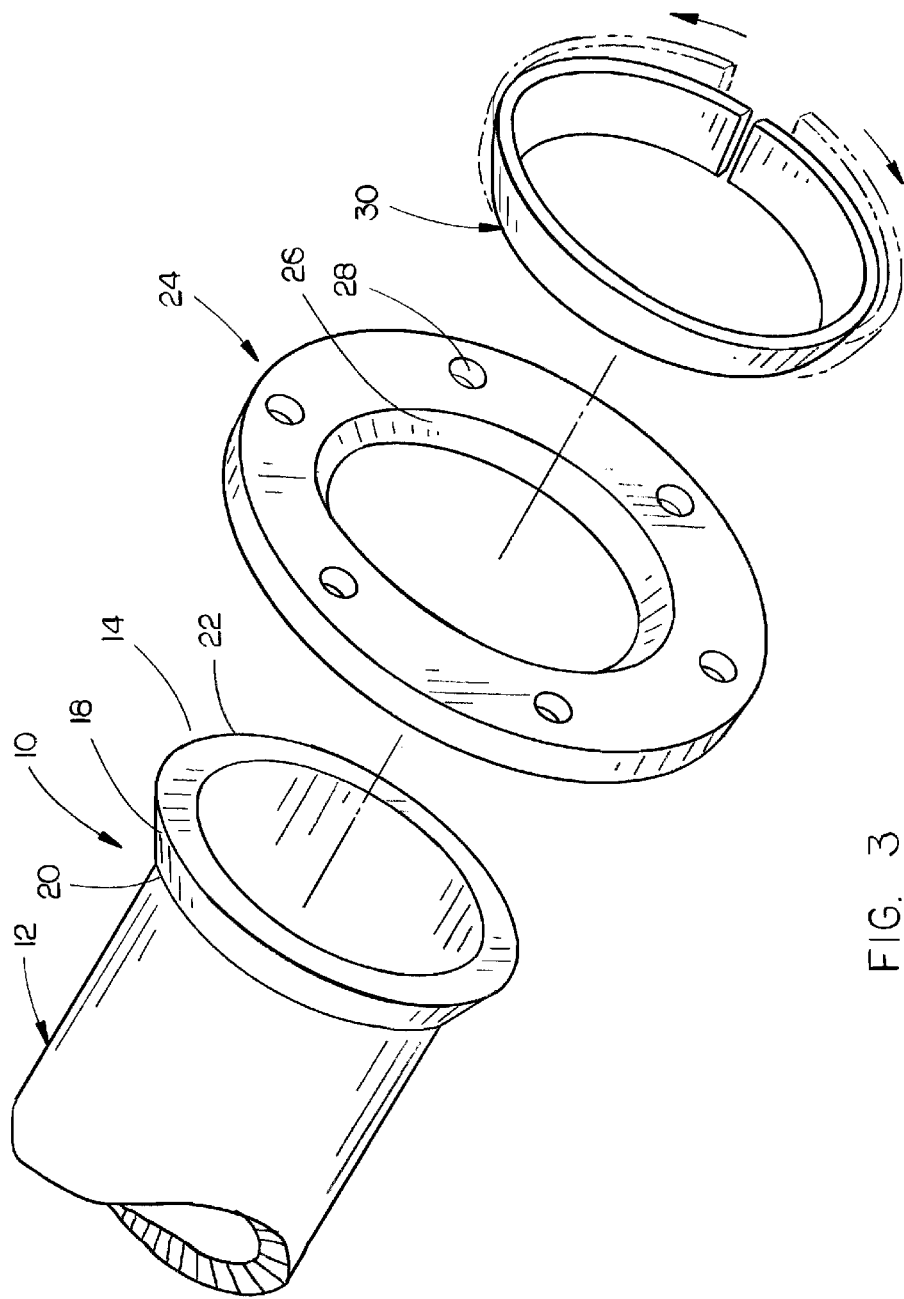
FIG. 3 is a partial exploded perspective view of one end of the fiberglass pipe of this invention with the associated pipe flange and split collet.
Figure 7:
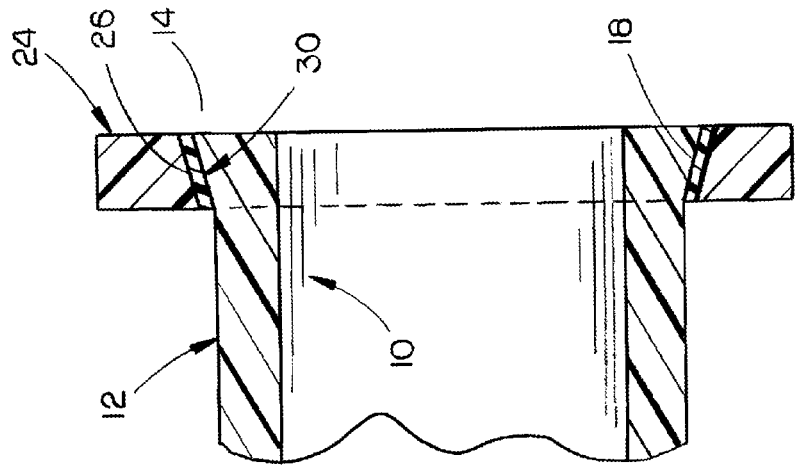
FIG. 7 is a partial sectional view illustrating the relationship of one end of the pipe, the split collet and flange in an assembled position.
Figure 6:
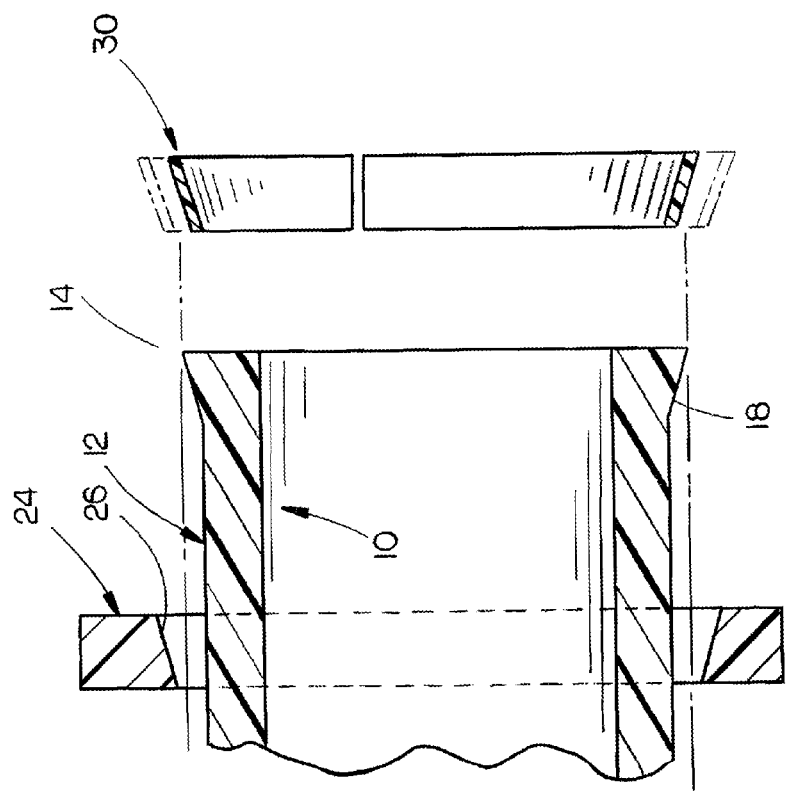
FIG. 6 is a partial exploded sectional view illustrating the manner in which the pipe flange and split collet are mounted on one end of the fiberglass pipe.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The term fiberglass as used herein is intended to encompass pipes constructed from a fiberglass material; pipes constructed of fiber reinforced plastic material; or a filament wrapped or wound fiberglass material; or any other material which includes fiberglass therein.

The fiberglass wound or fiberglass pipe of this invention is referred to by the reference numeral 10. Pipe 10 is cylindrical and elongated and will have a length as much as 20 feet or more. The diameter of pipe 10 will vary depending on the intended use thereof. Pipe 10 will be described as having a pipe portion 12 with ends 14 and 16. End 14 of pipe portion 12 has an outwardly tapered portion 18 with inner and outer ends 20 and 22 respectively. The outside diameter of inner end 20 has the same diameter as the outside diameter of pipe portion 12. The outside diameter of outer end 22 of tapered portion 18 is greater than the outside diameter of inner end 22 and pipe portion 12.

The numeral 24 refers to a fiberglass flange having a tapered central opening 26 which has a diameter which is just somewhat greater than the outside diameter of outer end 22 of tapered portion 18 to enable flange 24 to be initially slipped onto the end 14 of pipe portion 12. As seen, flange 24 has a plurality of bolt openings 28 formed therein.

The numeral 30 refers to a fiberglass tapered collet 30 which has the same taper as the tapered portion 18. As seen, tapered collet 30 is of the split type. The tapered collet 30 is spread apart to enable the collet 30 to be slipped inwardly past the outer end 22 of tapered portion 18. The tapered collet 30 is positioned so as to embrace the tapered portion 18 and is secured to tapered portion 18 by epoxy or the like. The flange 24 is then moved outwardly so that the tapered central opening 20 of flange 24 embraces the tapered collet 30. The flange 24 is secured to tapered collet 30 by epoxy or the like.

As seen, the combination of the tapered split collet 30 and the tapered central opening 26 oppose the tapered portion 18 so that it is almost impossible, if not completely impossible, for the flange 24 to be separated from the pipe 10.

The end 16 of pipe portion 12 is identical to that just described with the end 16 having a tapered portion 18', flange 24' with a tapered central opening 26', tapered and split collet 30'. The flange 24' and collet 30' are assembled as just described.

To summarize somewhat, the method of fabricating the fiberglass pipe 10 of this invention comprises the steps of: (1) providing an elongated fiberglass pipe having first and second ends; (2) forming an outwardly tapered portion at each of the first and second ends of the pipe with each of the tapered portions having an outer end; (3) providing first and second fiberglass pipe flanges having a tapered central opening with the tapered central openings of the pipe flanges having a greater diameter than the diameter of the outer ends of the tapered portions of the pipe; (4) slipping the first and second pipe flanges onto the first and second ends of the pipe respectively; (5) providing first and second fiberglass tapered split collets; (6) spreading and slipping the first and second collets onto the first and second ends of the pipe; (7) positioning the first and second collets with respect to the first and second tapered portions of the pipe so that the collets embrace the tapered portions thereof; (8) securing the collets to the tapered portions of the pipe with an epoxy material; (9) positioning the first and second pipe flanges so that the tapered central openings in the first and second pipe flanges embrace the first and second tapered split collets respectively; and (10) securing the first and second pipe flanges to the first and second collets respectively with an epoxy material.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. The method of securing a fiberglass pipe flange to a fiberglass pipe having a first end, comprising the steps of:
    forming an outwardly tapered portion on the first end of the pipe;
    creating a tapered wall surface in the pipe flange around the central opening thereof with the tapered wall surface corresponding to said outwardly tapered portion at the first end of the pipe;
    slipping the pipe flange inwardly over the tapered portion at the first end of the pipe;
    providing a tapered split fiberglass collet with the taper thereof corresponding to said tapered portion at the first end of the pipe;
    spreading the tapered split collet;
    slipping the tapered split collet inwardly over the tapered portion at the first end of the pipe;
    positioning the tapered split collet so that the tapered split collet embraces said tapered portion on the first end of the pipe;
    adhesively securing said tapered split collet to said tapered portion on the first end of the pipe;
    positioning the pipe flange so that said tapered wall surface of the pipe flange embraces said collet; and
    adhesively securing the pipe flange to said collet.

2. The method of claim 1 wherein the pipe flange is also adhesively secured to the tapered portion on the first end of the pipe.

3. The method of claim 1 wherein said collet is adhesively secured to said tapered portion on the first end of the pipe by an epoxy material.

4. The method of claim 1 wherein the pipe flange is adhesively secured to said collet by an epoxy material.

5. The method of claim 1 wherein the pipe has a second end and wherein another pipe flange is secured to the second end of the pipe in an identical manner as set forth in claim 1.

6. A fiberglass pipe, comprising:
    an elongated pipe portion having first and second ends;
    said first end of said pipe portion having an outwardly tapered portion formed therein with said tapered portion having an outer end and an inner end;
    a first tapered split collet embracing said tapered portion at said first end of said pipe portion and being adhesively secured thereto;
    said first tapered split collet being comprised of a fiberglass material;
    a first pipe flange having a tapered central opening formed therein;
    said first pipe flange being comprised of a fiberglass material;
    the diameter of said tapered central opening of said first pipe flange being greater than the diameter of said outer end of said tapered portion at said first end of said pipe portion;
    said tapered central opening of said first pipe flange embracing said first tapered split fiberglass collet and being adhesively secured thereto.

7. The fiberglass pipe of claim 6 wherein said first tapered split collet is secured to said tapered portion at said first end of said pipe portion by an epoxy material and wherein said first pipe flange is secured to said first tapered split collet by an epoxy material.

8. A fiberglass pipe, comprising:
    an elongated pipe portion having first and second ends;
    said first end of said pipe portion having an outwardly tapered portion formed therein with said tapered portion having an outer end and an inner end;
    a first tapered split collet embracing said tapered portion at said first end of said pipe portion and being adhesively secured thereto;
    said first tapered split collet being comprised of a fiberglass material;
    a first pipe flange having a tapered central opening formed therein;
    said first pipe flange being comprised of a fiberglass material;

the diameter of said tapered central opening of said first pipe flange being greater than the diameter of said outer end of said tapered portion at said first end of said pipe portion;

said tapered central opening of said first pipe flange embracing said first tapered split fiberglass collet and being adhesively secured thereto;

said second end of said pipe portion having an outwardly tapered portion formed therein with said tapered portion at said second end of said pipe portion having an outer end and an inner end;

a second tapered split collet embracing said tapered portion at said second end of said pipe portion and being adhesively secured thereto;

said second tapered split collet being comprised of a fiberglass material;

a second pipe flange having a tapered central opening formed therein;

said second pipe flange being comprised of a fiberglass material;

the diameter of said tapered central opening of said second pipe flange being greater than the diameter of said outer end of said tapered portion and said second end of said pipe portion;

said tapered central opening of said second pipe flange embracing said second tapered split collet and being adhesively secured thereto.

9. The fiberglass pipe of claim 8 wherein said second tapered split collet is secured to said tapered portion at said second end of said pipe portion by an epoxy material and wherein said second pipe flange is secured to said second tapered split collet by an epoxy material.

* * * * *